US011878818B2

(12) United States Patent
Pugia et al.

(10) Patent No.: US 11,878,818 B2
(45) Date of Patent: Jan. 23, 2024

(54) TUNABLE WATER-BASED MICROTHRUSTER DEVICES AND METHODS

(71) Applicant: Purdue Research Foundation, West Lafayette, IN (US)

(72) Inventors: Steven M. Pugia, Lafayette, IN (US); Anthony G. Cofer, Lafayette, IN (US); Alina Alexeenko, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 10 days.

(21) Appl. No.: 17/447,061

(22) Filed: Sep. 7, 2021

(65) Prior Publication Data

US 2023/0070933 A1     Mar. 9, 2023

(51) Int. Cl.
*B64G 1/40*     (2006.01)
*B64G 1/26*     (2006.01)
*B64G 1/24*     (2006.01)

(52) U.S. Cl.
CPC .............. *B64G 1/409* (2013.01); *B64G 1/244* (2019.05); *B64G 1/26* (2013.01)

(58) Field of Classification Search
CPC .......... B64G 1/244; B64G 1/26; B64G 1/402; B64G 1/403; B64G 1/409; F02K 9/42; F02K 9/425; F02K 9/44; F02K 9/60; F02K 9/605; F02K 9/974; F02K 99/00
See application file for complete search history.

(56) References Cited

PUBLICATIONS

Chia-Chin Chen, et al., Simulation and experiment research on vaporizing liquid micro-thruster, Jan. 1, 2010, Sensors and Actuators A: Physical, vol. 157, Issue 1, pp. 140-149 (Year: 2010).*
Mukerjee, E.V., et al., Vaporizing liquid microthruster, Sensors and Actuators A: Physical, May 22, 2000, vol. 83, Issues 1-3, pp. 231-236 (Year: 2000).*
Corning Glass Silicon Constraint Substrates Pyrex 7740 7740 Borosilicate Glass data sheet, available publicly at https://valleydesign. com/Datasheets/Corning-Pyrex-7740.pdf by Oct. 14, 2015, accessed Apr. 8, 2023 (Year: 2015).*

(Continued)

*Primary Examiner* — Scott J Walthour

(57) ABSTRACT

A microthruster for controlling small spacecraft and methods for manufacturing the same are disclosed. Embodiments of the microthruster include one or more nozzle throats with cross sectional areas of at most 20 $\mu m^2$, and some with 6 $\mu m^2$. Some embodiments include heaters that heat water in one or more reservoirs to increase pressure in the reservoirs and eject the water from the one or more nozzle throats. Some embodiments are manufactured by etching channels into one or more layers of material, and still further embodiments are manufactured by forming the nozzle throats and/or the reservoirs between two layers of material. Some microthruster embodiments are flat in shape with the nozzle throats ejecting water out the thin sides of the microthruster. Still further embodiments are formed by etching channels into one layer of material, printing a heater onto another layer of material, and bonding the two layers together.

21 Claims, 9 Drawing Sheets

(56) References Cited

PUBLICATIONS

A.G. Cofer, et al; "Film-Evaporation MEMS Tunable Array: Theory of Operation and Proof of Concept", Propulsion and Energy Forum; Jul. 28-30, 2014 Cleveland OH; 50th AIAA/ASME/SAE/ASEE Joint Propulsion Conference; 19 pages.

William John O'Neill; Purdue University; "Heat and Mass Transfer Analysis of a Film Evaporative MEMS Tunable Array", Theses and Dissertations, Jan. 2015; 109 pages.

W. O'Neill, et al; "Heat and Mass Transfer Analysis of a Film Evaporative MEMS Tunable Array Thruster", AIAA Aviation; Jun. 22-26, 2015, Dallas, TX; 45th AIAA Thermophysics Conference; 13 pages.

A.G. Cofer, et al; "Film-Evaporation MEMS Tunable Array for Low-Mass SmallSat Propulsion: Design Improvements and Thrust Characterization", Propulsion and Energy Forum, Jul. 27-29, 2015, Orlando FL, 51st AIAA/SAE/ASEE Joint Propulsion Conference; 17 pages.

Anthony Cofer Thesis; Purdue University Graduate School; "Film Evaporation MEMS Thruster Array for Micropropulsion", Dec. 1, 2015; 153 pages.

Steven M. Pugia, et al; "Characterization of Film Evaporating Microcapillaries for Micronewton Thrusters", 70th International Astronautical Congress 2019; Paper ID 55070; Oct. 21, 2019; 11 pages.

Steven M. Pugia, et al; "Failure Investigation and Improvement of MEMS Microthruster for SmallSat Attitude Control", 2020 AIAA SciTech Forum; Jan. 6, 2020; 17 pages.

Steven Pugia, et al; "Characterization of film-evaporating microcapillaries for water-based microthrusters", Acta Astronautica; Sep. 8, 2020; www.elsevier.com/locate/actaastro; 17 pages.

Steven M. Pugia; "Reliability Investigation and Design Improvement of Femta Microthruster", A Thesis Submitted to the Faculty of Purdue University; Published Aug. 2021 (submitted Aug. 2020); 154 pages.

\* cited by examiner

TUNABLE WATER-BASED MICROTHRUSTER DEVICES AND METHODS

GOVERNMENT RIGHTS

This invention was made with government support under contract number NNX18035512 awarded by the National Aeronautics and Space Agency (NASA) SmallSat Technology Partnership Program. The government has certain rights in the invention.

FIELD

Embodiments of the present disclosure related generally to propulsion devices and methods for small satellites, and to micropropulsion systems and methods for CubeSats.

BACKGROUND

The advent of small satellites for scientific and commercial missions has created new challenges in the field of propulsion. Many spacecraft propulsion technologies developed prior to the advent of CubeSats do not meet the strict size and power constraints of CubeSats such as by either providing insufficient thrust or by occupying a substantial amount of the CubeSat's volume thereby limiting its payload carrying abilities.

Compact micothrusters have the potential to provide attitude control, precision pointing control, increase mission duration and enable constellation flying for small satellites, such as CubeSats.

CubeSats have standardized sizes that are measured in "U" where 1U corresponds to a 10 centimeter (cm)×10 centimeter (cm)×10 centimeter (cm) profile. A typical 1U CubeSat has a peak power generation of 10 W to 25 W, so power consumption and thrust-to-power ratio are also key performance metrics for micropropulsion systems.

However, it was realized by the inventors of the current disclosure that problems exist with existing micropropulsion systems and methods and that improvements in propulsion systems and methods for small satellites are needed. Decreasing the mass and power requirements for micropropulsion systems will increase the utility of SmallSats by enabling longer duration missions, such as those beyond Low Earth Orbit.

Certain preferred features of the present disclosure address these and other needs and provide other important advantages.

SUMMARY

Embodiments of the present disclosure provide an improved microthruster devices and methods, such as tunable water-based microthruster array devices and methods.

A Film-Evaporating Micro-electromechanical system Tunable Array (FEMTA) is a micropropulsion device that generates thrust by heating a micron-scale water capillary to induce controlled film-evaporation.

Thrust stand tests under high vacuum have shown that FEMTA can produce controllable thrust of 150 μN at 70 s specific impulse using 0.65 W of electrical power and ultra-pure deionized water as propellant. The inventors of the present disclosure realized that improvements in the quiescent propellant loss rate that limits the lifespan and reliability of FEMTAs are needed.

Embodiments of the present disclosure include microthrusters that generate thrust by heating micron-scale fluid capillaries using heaters, for example, resistive heaters. Embodiments require no moving parts to generate thrust. At least one example embodiment with a thruster array of fifteen (15) nozzle throats that may be used for propulsion of small satellites, such as nano, pico and femto class satellites (one example being "CubeSats"), is capable of providing approximately 400 nanoseconds (Ns) of impulse per 1U of volume. Complete attitude control systems may have multiple microthrusters, such as twelve (12) microthrusters (each with fifteen (15) nozzle throats) for a complete CubeSat attitude control system.

Further embodiments of the present disclosure include microthrusters that offer various advantages over current micropropulsion technologies, such as low inert mass, low volume, low power consumption, low cost, use of a safe and abundantly available propellant source (for example, water), and/or ability to harvest propellant in-situ from other terrestrial bodies to extend mission length beyond those that require propellants brought from Earth. Embodiments of the thrusters disclosed herein have been demonstrated to generate thrust at 200-360 micronewtons per Watt (μN/W) while most current micropropulsion technologies require more than 10 Watts (W) of power to operate. Embodiments of the disclosed thruster measure 1 cm×1 cm×1 mm and can have a mass of 220 micrograms (μg). Still further embodiments utilize water as a propellant, and the supply pressure for the water may be less than <1 atmosphere (atm), which can facilitate entire propulsion systems that can be exceptionally compact and light. Some embodiments for nano-class satellites have had wet masses of 30-40 grams (g) with volumes of 1 cubic inch (in²). Still other embodiments are scaled down even further to meet the requirements of, for example, pico and femto class satellites. To the knowledge of the inventors, no other existing micropropulsion technology can offer similar performance characteristics, such as both an operation power of less than 1 W and a wet mass less than 100 g.

In accordance with a first aspect of embodiments of the present disclosure, a microthruster is disclosed. The microthruster includes a first layer and a second layer bonded to the first layer. The first and second layers define a nozzle throat positioned between the first and second layers, the first layer defining at least one wall of the nozzle throat and the second layer defining at least one wall of the nozzle throat.

In accordance with another aspect of embodiments of the present disclosure, a method of manufacturing a microthruster for a spacecraft is disclosed. The method includes forming a nozzle throat channel for a micronozzle in a first layer or a second layer, and forming a propellant reservoir channel in the first layer or the second layer. The method further includes bonding the first layer and the second layer to one another, the bonding forming a nozzle throat for ejecting propellant from the microthruster, and the bonding also forming a propellant reservoir in fluidic communication with the nozzle throat.

In accordance with further aspects of embodiments of the present disclosure, a microthruster for a spacecraft is disclosed. The microthruster includes a water reservoir and a nozzle throat in fluid communication with the water reservoir. The nozzle throat defines a cross sectional area equal to or less than 20 μm².

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting. As an example.

FIG. 9 is an illustration of a manufacturing process for producing a microthruster according to one embodiment of the present disclosure.

FIG. 10 is an expanded view of an assembled microthruster manufactured according to the process depicted in FIG. 9.

DETAILED DESCRIPTION OF THE ILLUSTRATED EMBODIMENTS

Figure 1:
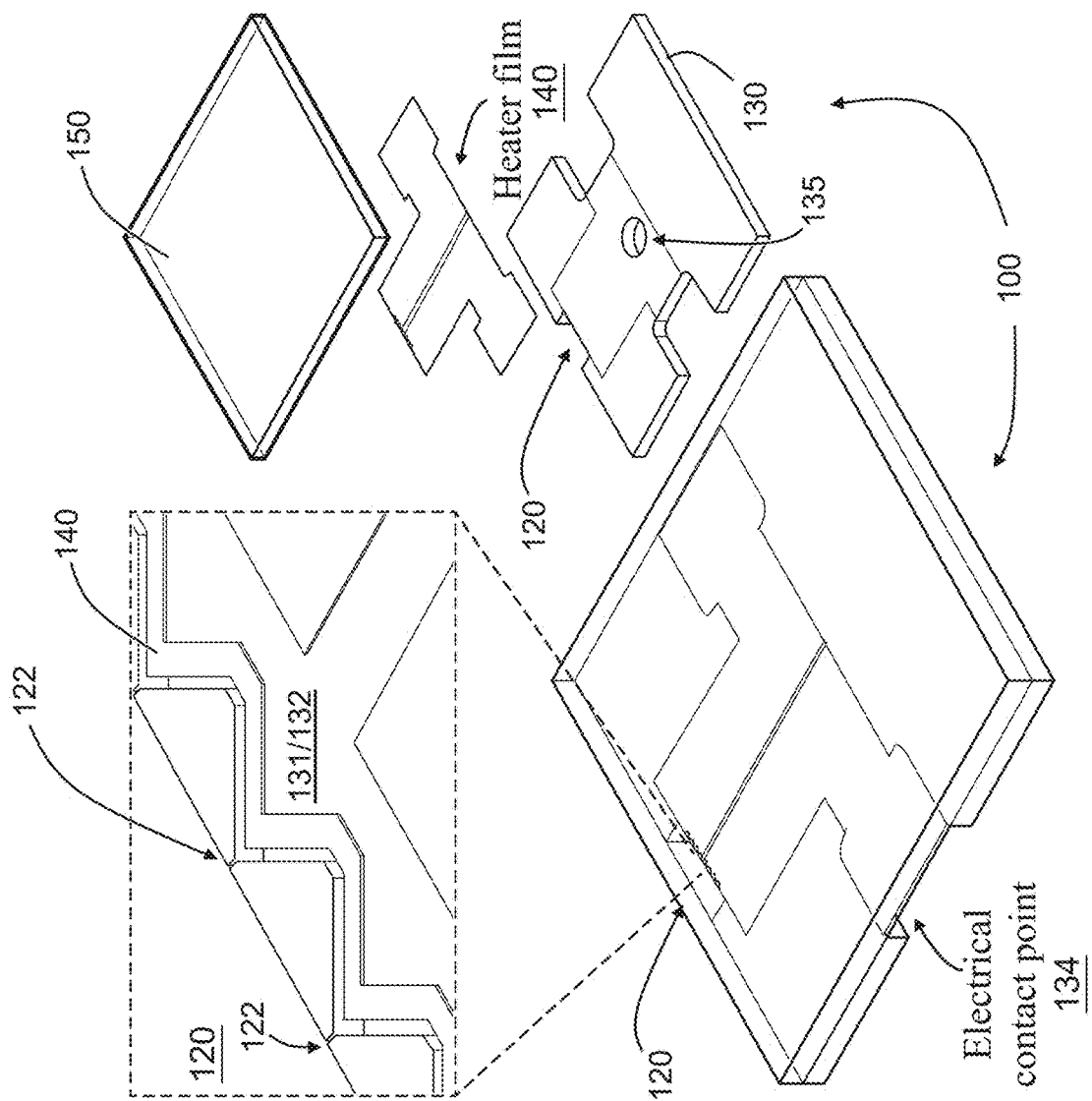
FIG. 1 is an illustration of an assembled microthruster with a partial, expanded view of the nozzle array with the top layer removed, and an exploded view according to one embodiment of the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure provide a microthruster for small spacecraft that delivers tunable thrust for controlling, for example, the orientation of a spacecraft. Embodiments include microthrusters that require less than 1 Watt (W) of electrical power to produce thrust, and still further embodiments utilize water as a propellant.

A microthruster 100, which may be referred to as a Film-Evaporating Micro-electromechanical system Tunable Array (FEMTA), according to one embodiment of the present disclosure is depicted in FIGS. 1-5. FIG. 1 is a CAD rendering of an embodiment that was designated B32 during testing. Microthruster 100 includes a first layer of material 130 (for example, a bottom layer), a second layer of material 150 (for example, a top layer), a heater 140 (for example, a heating element), a propellant reservoir 132 (for example, a water reservoir) and at least one nozzle 110.

Nozzle 110 is positioned between the first layer 130 and the second layer 150. Nozzle 110 includes an exhaust cavity 112, one or more nozzle throats 122 (each of which may be referred to as micronozzles), and a propellant reservoir 132 defining at least two propellant reservoir side walls 133 adjacent each nozzle throat 122.

Nozzle throat 122 defines a nozzle throat width 123, a nozzle throat height 124 and a nozzle throat length 125. In the illustrated example embodiment, nozzle throat width 123 is 1 µm, nozzle throat height 124 is 6 µm, and nozzle throat length 125 is 6 µm.

The nozzle throat cross sectional dimension of 1 μm×6 μm were used since it appeared to have simultaneously maximized (or at least provided a noticeably increased) Laplace pressure and minimized (or at least provided a noticeably decreased) nozzle exit area, which advantageously reduces (for example, water) leaking through the nozzle throat, generation of ice within nozzle 110 and/or background evaporation. Some embodiments utilize tall/narrow nozzle exit areas (for example, 1 μm width and 6 μm height) such as the nozzle throat 122 depicted in FIG. 2 while other embodiments utilize short/wide nozzle exit areas (for example, 6 μm width and 1 μm height).

Figure 2:
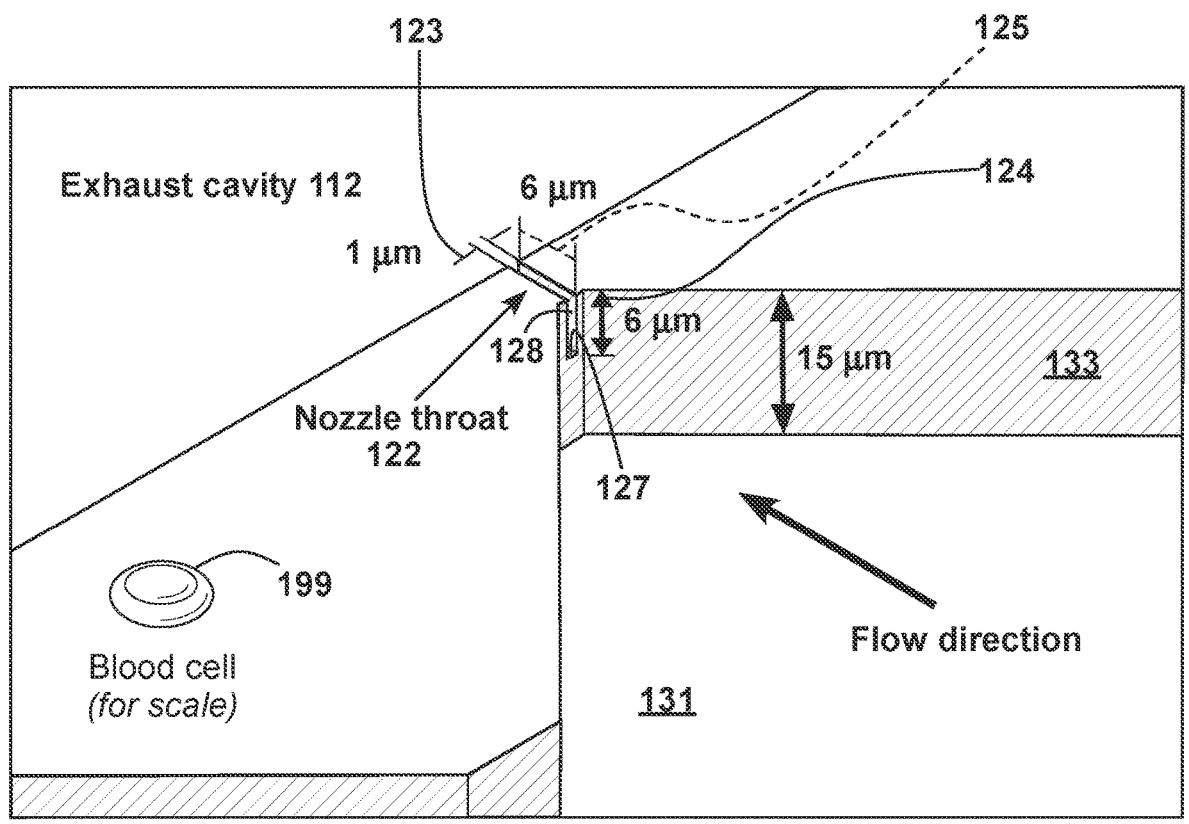
FIG. 2 is a partial, expanded view of the bottom layer depicting details of a single nozzle in the nozzle array depicted in FIG. 1.
Figure 4:
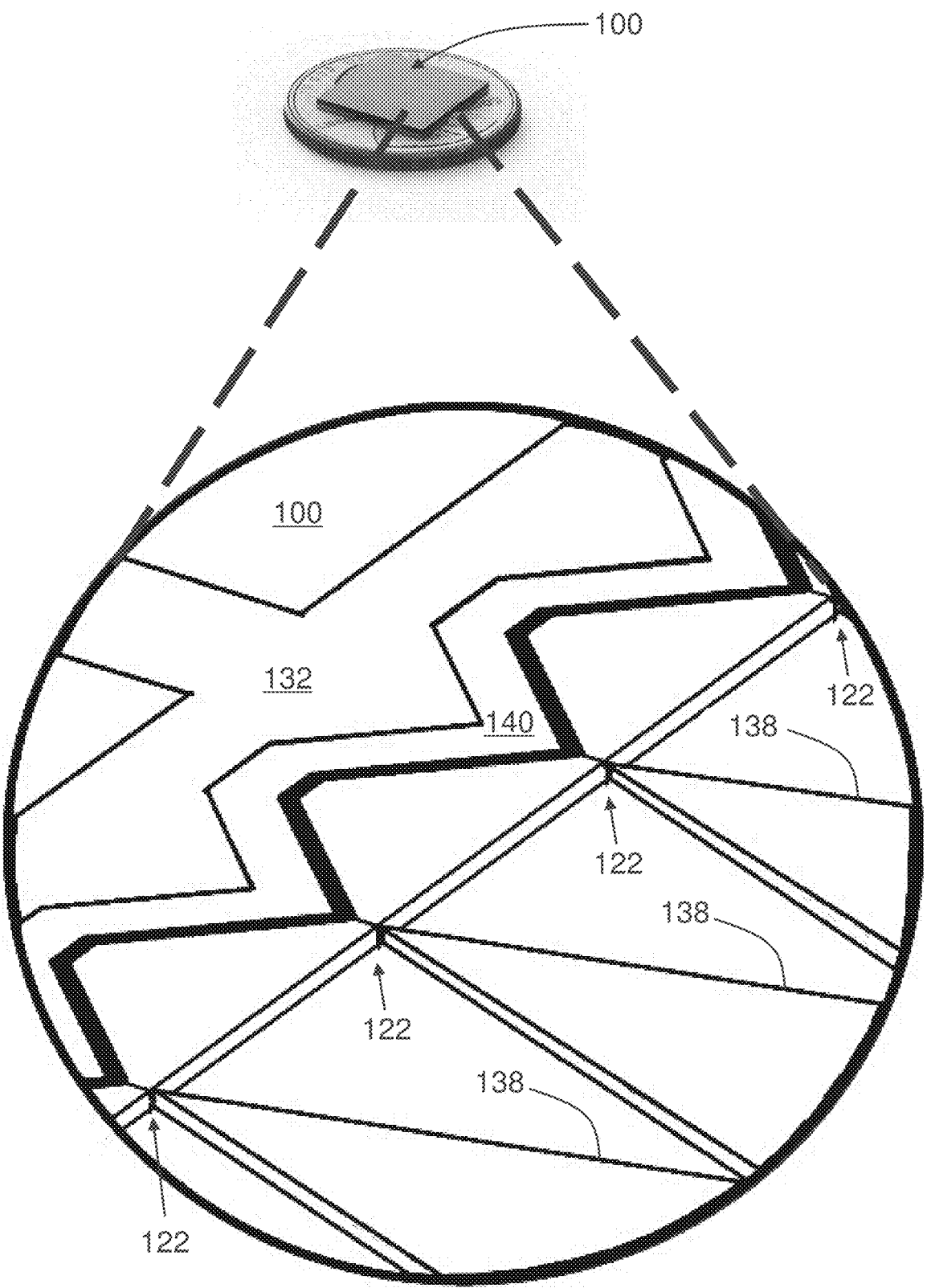
FIG. 4 is a perspective view of the microthruster depicted in FIG. 1 positioned on a U.S. one cent coin (penny) with an enlarged, partial view of the nozzle array ejecting propellant.
Figure 8:
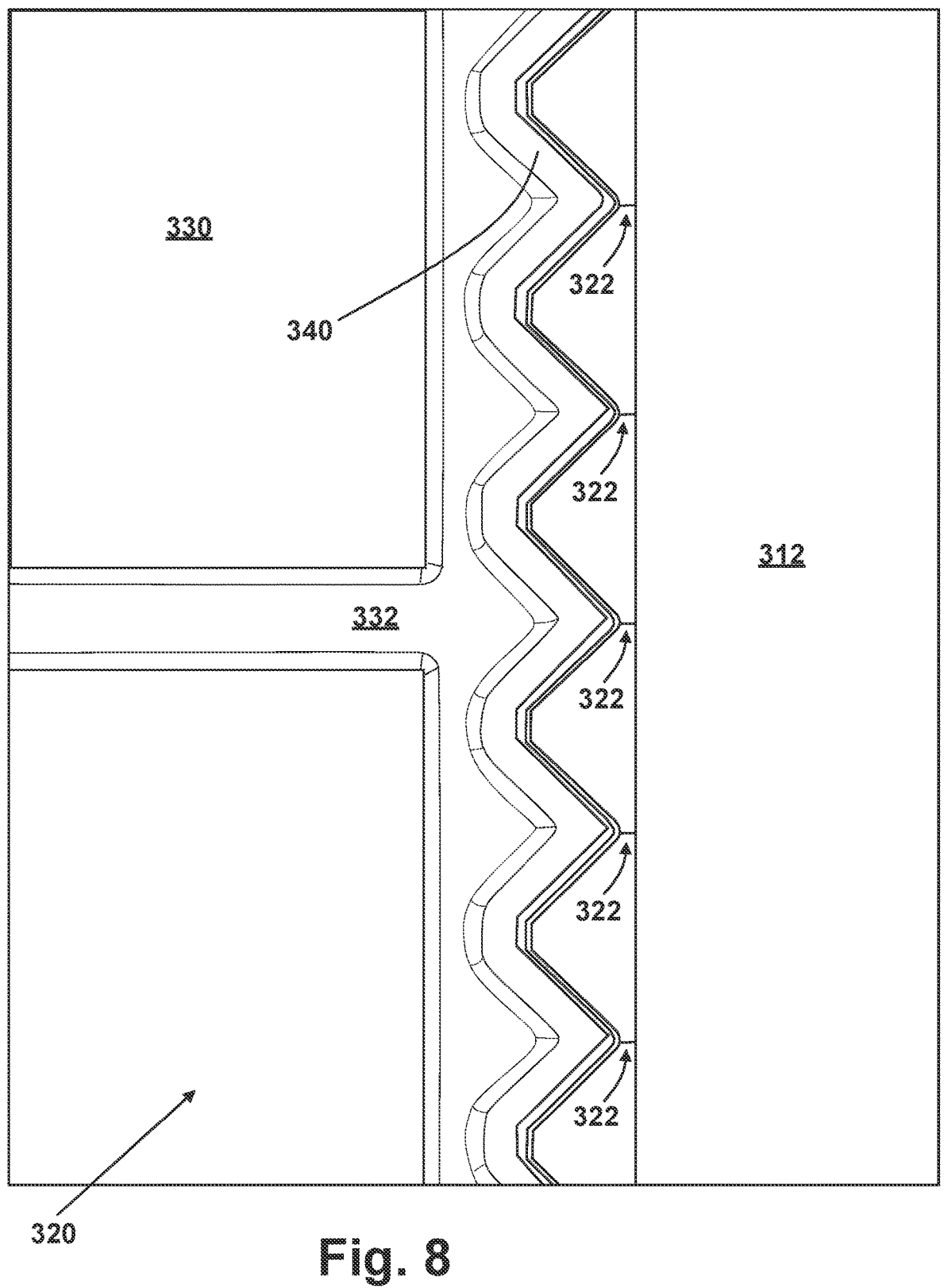
FIG. 8 is a partial view of a microscopic image of a microthruster array manufactured according to one embodiment of the present disclosure.

The tall/narrow nozzle 110 dimensions of microthruster 100 depicted in FIG. 2 result in a Laplace pressure of 162 kilopascals (kPa). To increase thrust, such as for CubeSat attitude control, multiple (for example, 12 or 15) nozzles are positioned in a linear array as depicted in FIGS. 1, 4 and 8.

The amount the propellant reservoir side walls 133 are angled with respect to the nozzle throat can affect the thrust produced at each nozzle throat 122, and therefore by nozzle 110 overall. If the angle is too small, the liquid may have difficulty flowing up to the nozzle throat 122 at a rate needed, thereby limiting the thrust. If the angle is too large, the liquid interface may not be flexible to fluctuations in upstream pressure and will not have a guide to direct the vapor flow prior to acceleration through the throat. In embodiments, angle 138 (see FIG. 3) is from 120 degrees to 165 degrees, and in particular embodiments angle 138 is 135 degrees.

A heater 140 is positioned in the vicinity of each nozzle throat 121 and heats the propellant (for example, water) in the propellant reservoir 132. The closer the heater 140 is to the nozzle throat 121, the more efficient the thruster will be. However, if the heater 140 touches the first layer, the heater 140 will short and will not work. In some embodiments the heater 140 is immediately adjacent each nozzle throat 121, while in other embodiments (such as the embodiment depicted in FIGS. 1-5) the heater 140 is spaced slightly from each nozzle throat (for example, between 1 μm and 10 μm from the nozzle throat, in some embodiments between 2 μm and 5 μm from the nozzle throat, and in particular embodiments 3 μm from the nozzle throat), and in still further embodiments the heater 140 is positioned farther from the nozzle throat and more in the interior of propellant reservoir 132. Although the heater 140 is depicted as being on the top of the propellant reservoir, other embodiments have a heater positioned on the bottom of the propellant reservoir and/or on one or more side walls 133.

In embodiments of nozzle 110 including two or more nozzle throats 122, the nozzle throats 122 are arranged in a nozzle array 120.

An optional propellant tank (not depicted) can be used to hold additional propellant for the propellant reservoir 132. An propellant supply port 135 may be used to connect and allow propellant to move from the propellant tank to the propellant reservoir 132 and supply propellant (for example, water) to the propellant reservoir 132 and the nozzle 110.

The embodiments depicted in FIGS. 1-10 include example dimensions. Other embodiments include dimensions that vary, but generally include nozzle throat 122 cross sectional areas of less than or equal to 20 μm², other embodiments include nozzle throat 122 cross sectional areas of less than or equal to 10 μm², and still further embodiments include nozzle throat 122 cross sectional areas of approximately 6 μm².

Embodiments of the present disclosure are capable of generating 200-360 micronewtons (μN) of thrust per watt of electrical power using, for example, water (such as, ultra-pure deionized water) as a propellant. Embodiments may be created on 1 centimeter (cm)×1 centimeter (cm)×0.5 millimeter (mm) silicon and glass chips using microfabrication techniques that facilitate batch production of the microthrusters.

Figure 3:
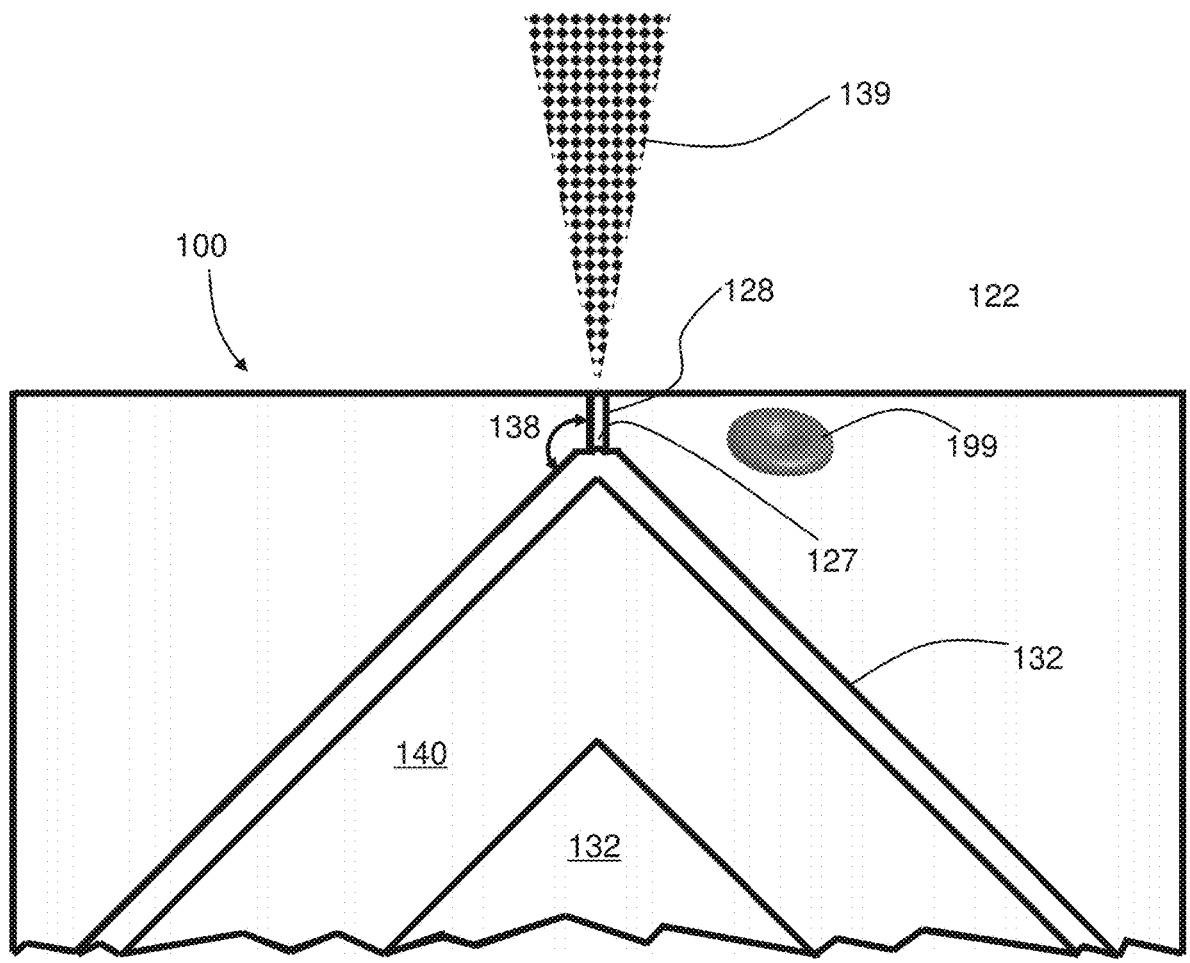
FIG. 3 is a schematic view of a single nozzle in a nozzle array depicted in FIG. 1 ejecting propellant.

To produce thrust, the heating element 140 heats the propellant (for example, water) to a point where the pressure increases sufficiently to cause propellant to move from the propellant reservoir 132 into the one or more nozzle throats 122, and to be ejected from the nozzle throat 122 into the exhaust cavity 112 and into the exterior regions surrounding microthruster 100 (for example, space). Example propellant jets 138 being ejected from microthruster 100 are depicted in FIGS. 3 and 4. In many embodiments, this occurs when the propellant transitions from liquid to vapor with the vapor being ejected from the nozzle throat.

Elements depicted in FIGS. 6-10 with reference numerals similar to (e.g., with the last two digits the same) or the same as those depicted in FIGS. 1-5 can function similar to (or the same as), be manufactures in a similar (or identical) manner, and have characteristics (and optional characteristics) similar to (or the same as) the elements in the other figures unless shown and/or described as being incapable of having those functions or characteristics.

Figure 5:
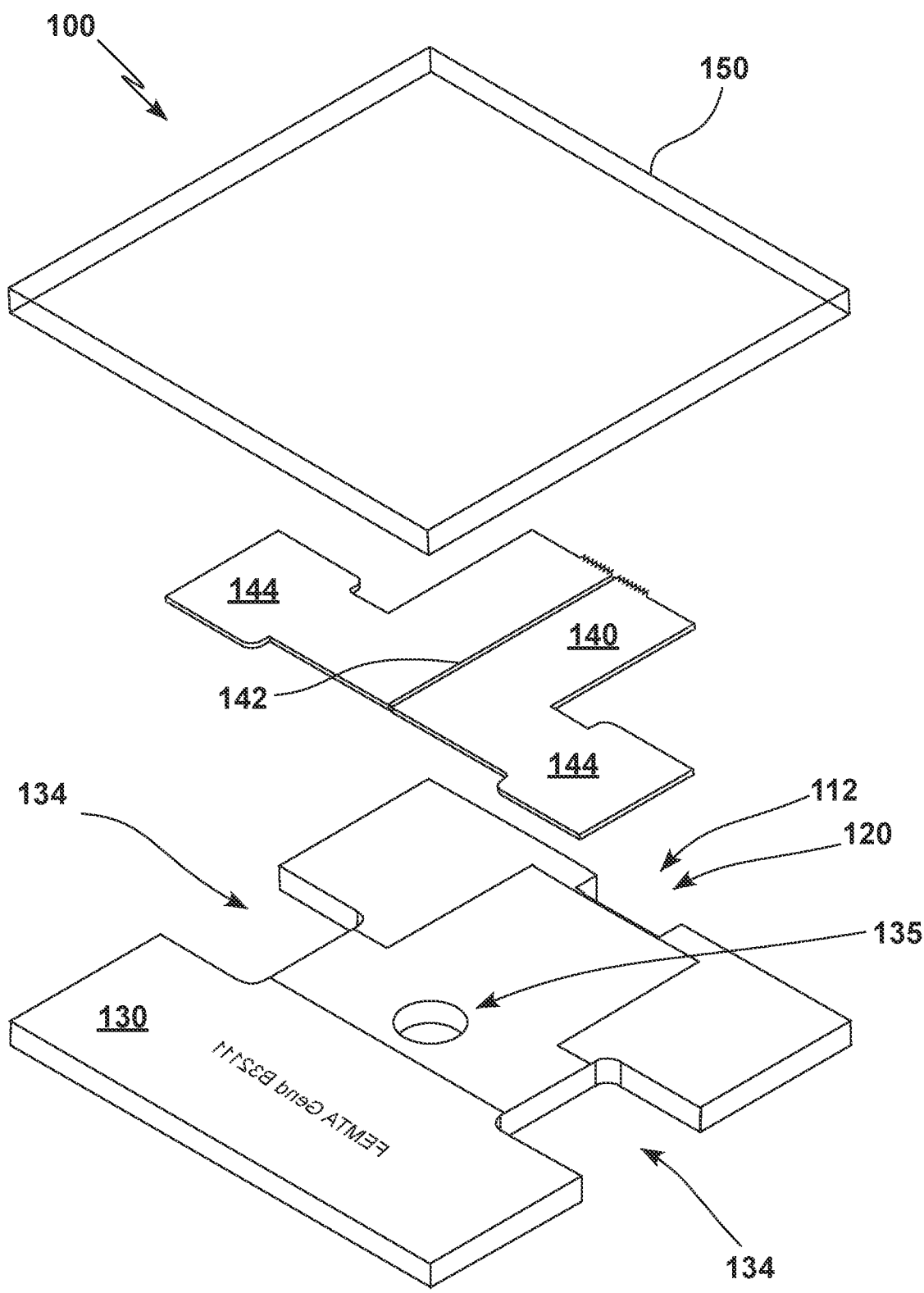
FIG. 5 is an enlarged, expanded view of the microthruster illustrated in FIG. 1.
Figure 6:
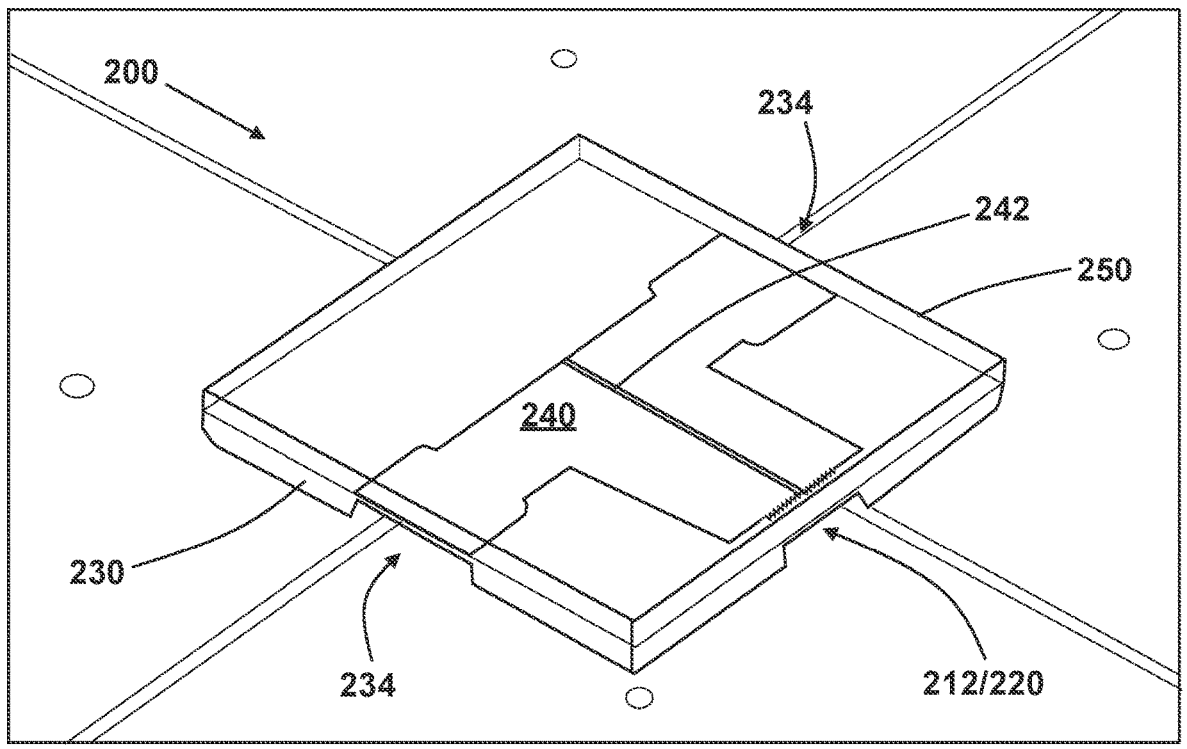
FIG. 6 is a perspective illustration of the top of a microthruster manufactured according to one embodiment of the present disclosure positioned on a background surface.
Figure 7:
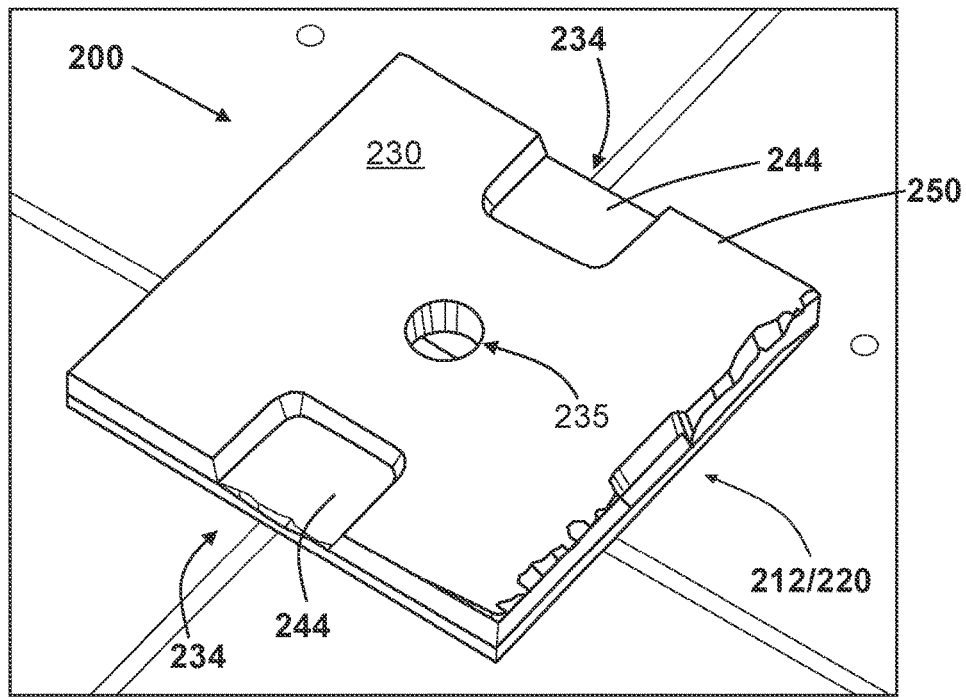
FIG. 7 is a perspective illustration of the bottom of the microthruster depicted in FIG. 6 positioned on the background surface.

Depicted in FIGS. 5 and 6 is a picture of a microthruster 200 manufactured according to embodiments of the present disclosure. Microthruster 200 includes features similar to the features described in FIGS. 1-5, although some of the features are not capable of depiction in these pictures. As depicted in FIGS. 6 and 7, microthruster 200 is substantially planar with thin side surfaces (for example, side surface with a height less than or equal to one-fifth of one of the other dimensions, such as width or length. In the embodiment illustrated in FIGS. 5 and 6, the width and length of microthruster 200 are approximately equal to one another, and the height of microthruster 200 is approximately one-tenth (1/10) the width. Microthruster 200 includes a nozzle exhaust cavity 212, a nozzle array 220, a first layer 230, access ports 234, an propellant supply port 235, a heating element 240, a heating element channel 242, electrical contact pads 244, and a second layer 250.

FIG. 8 is a microscopic image of a nozzle array 320 according to one embodiment of the present disclosure. Nozzle array 320 includes a nozzle exhaust cavity channel 312, nozzle throat channels 322, first layer 330, propellant reservoir channel 332 and heating element 340.

Figure 9:
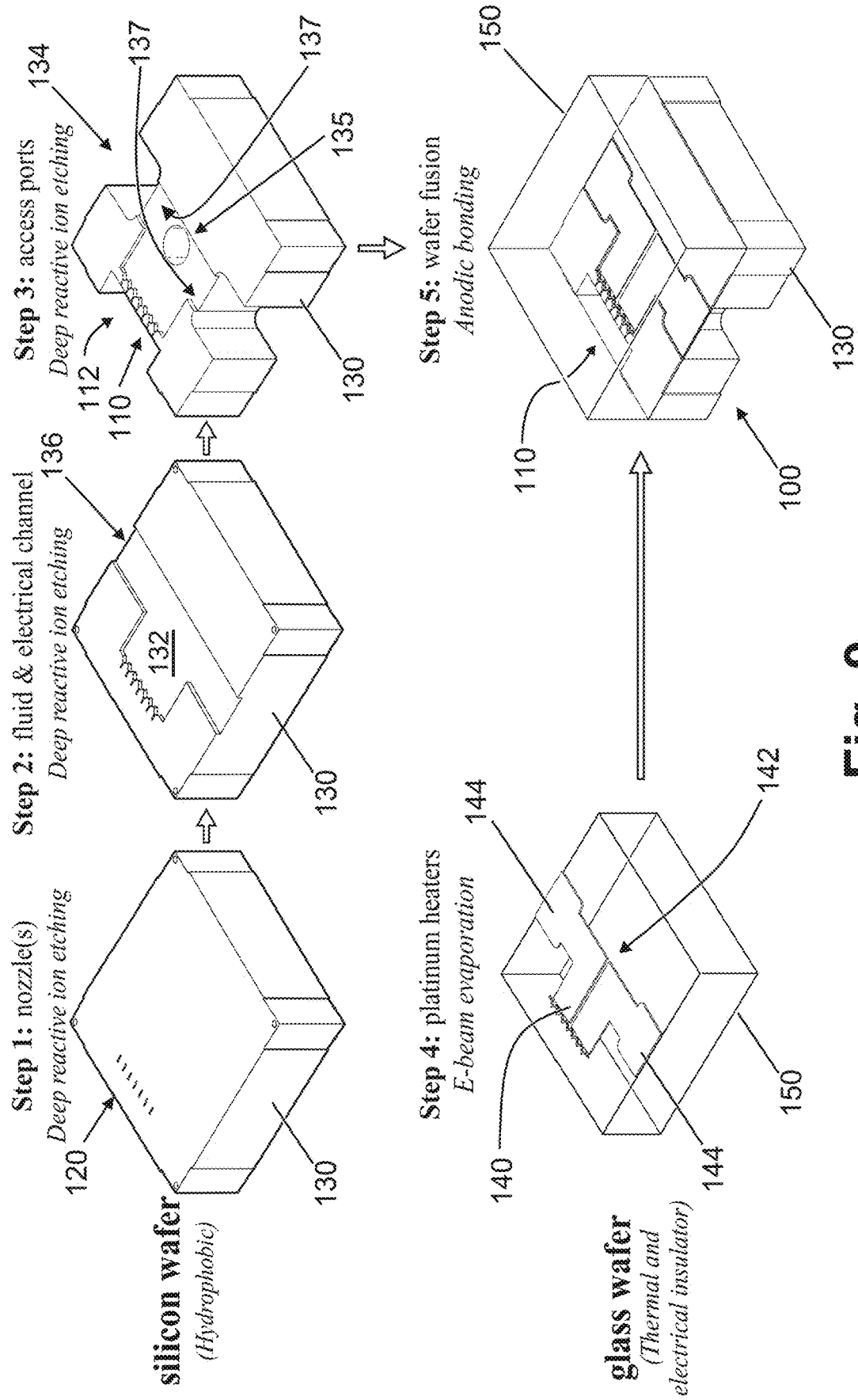
FIGS. 9 and 10 are not to scale and the proportions in these drawings have been exaggerated.

FIG. 9 depicts a manufacturing process (for example, a microfabrication process) for producing a microthruster 100 according to one embodiment of the present invention. The first illustrated step (FIG. 9, top row, left illustration) is to dry etch one or more channels that will form the nozzle throats 122, alignment marks, identification numbers, and dicing lines in the first layer 130 to a desired depth (for example, 6 μm). The first layer 130 may be referred to as the "bottom" layer and in at least one embodiment is a hydrophobic material, such as a silicon wafer. An etching process, such as Deep Reactive Ion Etching (DRIE), may be used. In at least one embodiment a channel that will form the propellant reservoir 132, which may also be used as a fluid inlet and/or a recess to accommodate the heating element, is not created with the initial etching since it is etched to a different depth than the nozzle throats 122. In alternate embodiments, such as those where the nozzle throats are approximately the same depth as the propellant reservoir 132, the channel for propellant reservoir 132 is etched during the initial etching.

Next (FIG. 9, top row, center illustration), the channel for the propellant reservoir 132 can be etched to a desired depth, for example, a depth of 15 μm, using, for example, DRIE. The channel for the propellant reservoir 132 can overlap slightly with the channel for the nozzle throats 122, which can facilitate fluidic communication and continuity between the propellant reservoir 132 and the nozzle throats 122. A thicker photoresist mask may be used for this portion of the manufacturing process to facilitate proper coating of the walls of the existing features.

Having the channel for the propellant reservoir 132 etched to a depth larger than that of the channels for the nozzle throats 122 (for example, etching the propellant reservoir 132 to a depth of 15 μm), which is facilitated by etching the channel for the propellant reservoir 132 separately from the nozzle throats 122, facilitates the propellant (for example, water) reaching the nozzle throats 122 when the microthruster 100 is operating in the vacuum of space.

Step three (FIG. 9, top row, right illustration) can be creation of a propellant propellant supply port 135, a channel for the nozzle exhaust cavity 112, and/or electrical access ports 134 using, for example, DRIE. The nozzle exhaust cavity 112 may be etched directly through the wafer (first layer), which can help reduce viscous losses when firing the nozzle 110. To assist in producing thrust, a large exhaust cavity 112 (large in comparison to the nozzle throats 122) is etched through the wafer immediately downstream of the nozzle throats. In the illustrated embodiment, the height of the exhaust cavity 112 is equal to the thickness of the first layer 120 (which is approximately 0.5 millimeters (mm) thick in at least some embodiments) and is sufficiently large to permit complete expansion of the exhaust stream. Holes for contact pins may also be etched at this time so that contact pins can access the heater pads.

To allow access for electrical connection to the heater 170, access ports 134 are etched directly through the first layer 130 (for example, a silicon wafer) creating electrical contact pads, which are portions of the heating element 140. The access portion 134 may be relatively large in relation to the other features of the microthruster. In embodiments where the channel for the propellant reservoir 132 extends to the access ports 134, openings of the propellant reservoir 132 will be formed at each access port 134 when the first and second layers are bonded to one another. A sealant (such as silicone) may be used to seal these opening.

At some time during the manufacturing process (which may occur before, during or after the above discussed steps) one or more heating elements 140 may be deposited onto the second layer 150 as depicted in FIG. 9, bottom row, left illustration. Second layer 150 may also be referred to as the "top" layer, and in at least one embodiment the second layer is glass, such as a borosilicate glass wafer. One advantage in using borosilicate is that borosilicate glass is a good thermal and electrical insulator. Having a second layer 150 with good thermal insulating properties helps minimize heat being absorbed by the second layer 150 thereby allowing more of the heat produced by the heater 140 to heat the propellant. Borosilicate glass has similar thermal and electrical properties compared to silicon dioxide insulation layers that are used in other microthruster designs.

In at least one embodiment an electron beam evaporation method is used to deposit the one or more heating elements 140 onto the second layer. In at least one embodiment, a titanium adhesion layer (which may be, for example, 20 nanometers (nm) thick) is deposited onto the second layer 150 followed by a platinum layer (which may be, for example, thicker than the titanium layer, such as 170 nm thick) on top of the titanium layer resulting in the platinum layer being between the second layer 150 and the titanium layer. The heating element 140 may optionally include a channel 142 to help facilitate movement of propellant to the nozzle 110. The thickness of second layer 150 is approximately 0.5 mm.

When the first and second layers are connected, as illustrated in FIG. 9, bottom row, right illustration, the heating element 140 forms one surface (for example, the "top" surface) of at least a portion of the propellant reservoir 132. In the illustrated embodiment, the heating element 140 forms the top surface/wall of the entire propellant reservoir 132, although in other embodiments the heating element 140 forms less than the entire top surface/wall of the propellant reservoir 132. The heating element 140 may also include a channel 142 to help the functioning of the heating element 140. A thinner channel 142 maximizes the cross sectional area of the heating element 140 in the regions where the water is not intended to vaporize and minimize the cross sectional area of the heating element 140 in the regions where the water is intended to vaporize, for example, near the nozzle throats.

The first layer 130 (for example, a silicon wafer) and the second layer 150 (for example, a glass wafer) are bonded together, such as by anodic bonding. Bonding the first layer 130 and the second layer 150 together forms the nozzle throat 122 and the propellant reservoir 132, with the bottom and side walls being formed by cavities in the first layer 130 and the second layer 150 (and in some locations the heating element 140) forming the top surface/wall of the nozzle throat 122 and the propellant reservoir 132. However, in some embodiments all or portions of the nozzle throat side walls 128 and/or the propellant reservoir side walls 133 may be formed by the second layer 150. In still further embodiments, portions of the bottom walls of the nozzle throat 122 and/or the propellant reservoir 132 may be formed by the second layer 150. And in still further embodiments, portions of the top surface/walls of the nozzle throat and/or the propellant reservoir 132 may be formed by the first layer 130.

Alignment may be required prior to bonding to facilitate correct positioning of the heating elements 140 relative to the features on the first layer 130.

Using these methods, an average nozzle throat width 123 of 1 μm and an average nozzle aspect ratio of 6 (the ratio of nozzle throat height 124 to nozzle throat width 123) was capable of being achieved. During an actual fabrication process, an average nozzle throat width 123 of 1.1 μm and an average nozzle aspect ratio of 6.3 was achieved, and during another actual fabrication process an average throat width of 1.4 μm (which corresponded to a Laplace pressure of 86 kPa) was achieved.

Alignment of the first layer 130 and the second layer 150 during bonding can be important. For example, if the two layers are misaligned sufficiently to result in portions of the heater overlapping with the surfaces being bonded, such as overlapping with the first layer, proper bonding will not occur and the microthruster 100 will not operate properly. In embodiments where the first layer is a silicon wafer, misalignment sufficient to place the heating element 140 in contact with the silicon substrate can cause significant amounts of the thermal power to be lost to the silicon substrate due to the thermal conductive properties of the silicon rather than being used to heat the propellant (for example, water).

Figure 10:
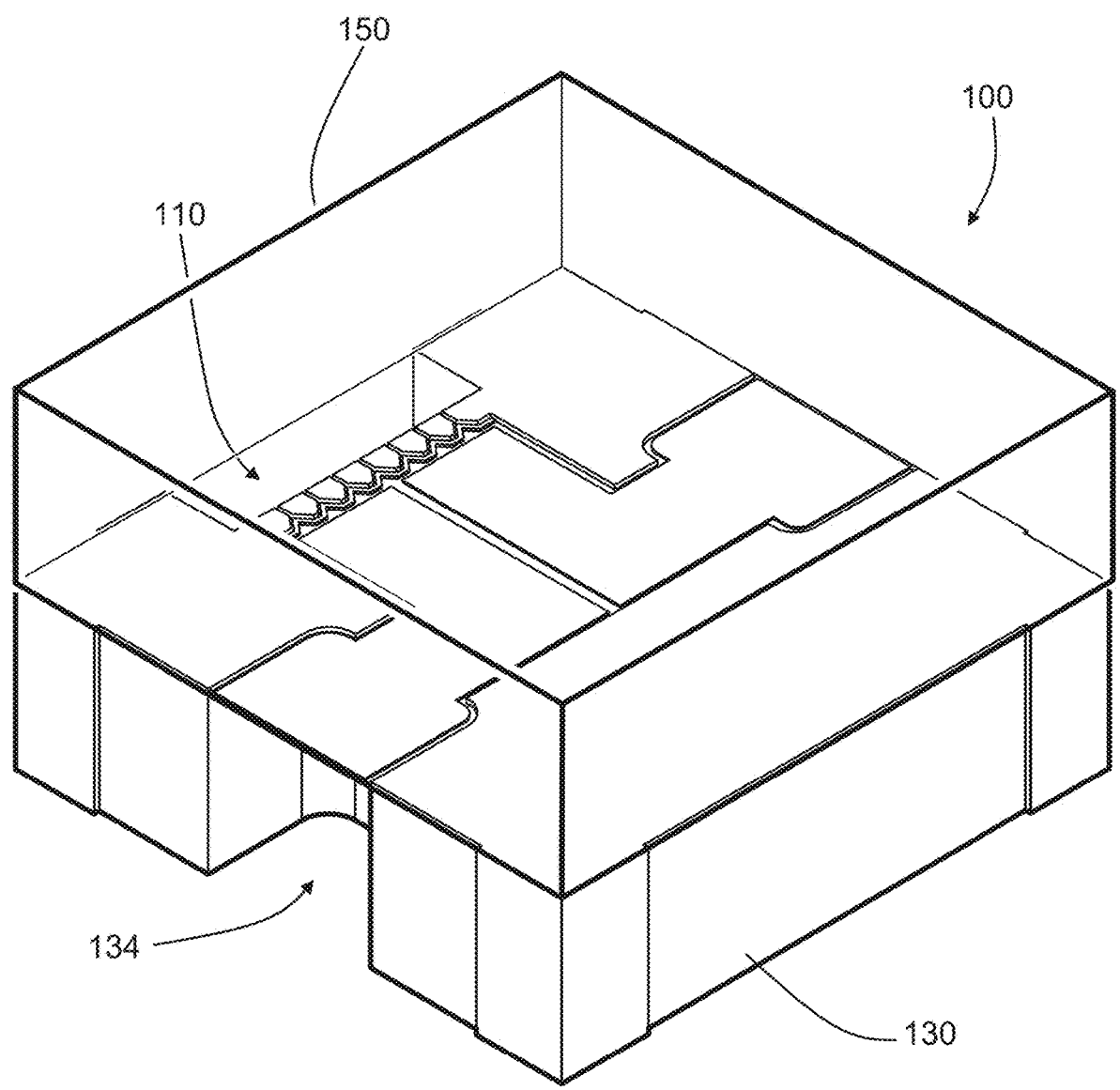

FIG. 10 is an enlarged view of the assembled microthruster 100 depicted in FIG. 9 showing details more clearly.

Advantages of embodiments of the present disclosure include microthrusters with decreased leaking and ice generation compared with earlier microthrusters, resulting in increased reliability and lifespan of microthruster 100 over earlier designs.

The liquid surface temperature required to fire microthruster 100 is significantly higher than that of other microthruster designs. Having a higher firing temperature reduces the risk of a misfiring due to ambient heat transfer while the device is in space, which can occur when the exhaust cavity 112 of microthruster 100 is facing the sun or when the spacecraft outputs waste heat. The isentropic specific impulse of microthruster 100 is higher as well when compared to other microthrusters since, for example, the effective stagnation enthalpy (and/or temperature) is greater for this design of microthruster.

The cross sectional exit area of each nozzle throat 122 of embodiments of the present disclosure are significantly smaller than earlier microthruster designs, and even significantly smaller than earlier FEMTA designs. For example, the nozzle throats 122 of various embodiments of the present disclosure are two orders of magnitude smaller than the nozzle throats of other microthruster designs, which helps reduce quiescent evaporation and standby thrust. The example embodiment depicted in FIGS. 1-5 was 111 times smaller.

Because of these improvements in miniaturizing the size of the nozzle throats 122, microthruster 100 will be able to sit in standby in space for longer periods. As an example, with 10 grams (g) of initial propellant, microthruster 100 is predicted to be capable of sitting in standby in space for 1.37 years while prior art microthruster designs using similar propellants (for example, water) would run out of propellant in just 4.49 days. Microthruster 100 also has a background thrust that is no more than 0.16 micronewtons (μN) while the background thrust of prior art microthruster designs using similar propellants (for example, water) had background thrust values greater than 15 μN. Due to isentropic assumptions used to calculate the standby life and background thrust, the actual standby life should be longer for each design and the background thrust should be lower. The techniques used to fabricate microthruster 100 facilitate creation of these smaller nozzle throats, and in particular nozzle throats that are narrower and/or smaller than earlier microthruster designs, including earlier FEMTA designs.

The microthruster 100 also offers improvements in impulse density (N-s/U) and thrust-to-power ratio compared to existing micropropulsion alternatives.

In embodiments with a nozzle array 120 of 15 nozzles throats 122, each of which had a nozzle throat width 123 of 1 μm, a nozzle throat height of 6 μm and a nozzle throat length 125 of 6 μm, the cumulative throat outlet area for all 15 nozzles is 90 μm$^2$, which corresponds to an isentropic background evaporation rate that is 111 times lower than the previous microthruster designs. Given 10 g of initial propellant, this embodiment is capable of being in standby in vacuum for 1.37 years or more before the propellant complete evaporates. In contrast, the previous generation device would run out of propellant in just 4.49 days. In these embodiment, the background thrust is capable of being less than 1 μN with a firing temperature greater than 100 degrees Centigrade (° C.), which minimizes the risk of misfiring. Isentropic flow is assumed for this temperature estimation since it is extremely difficult to measure temperature at these scales and the actual temperature would likely be even higher. This embodiment is also capable of producing between 359.6 μN/W and 203.4 μN/W of thrust at power levels ranging from 50 mW to 400 mW, respectively, although no upper bound on the input power has yet been determined.

Other advantages include the ability to vary the thrust produced by microthruster 100. Variable thrust is achieved by varying the electrical power of the heating element 140. In at least one test of embodiments of microthruster 100, variable thrust was achieved by varying the power levels between 100 milliwatts (mW) and 400 mW in 100 mW increments. The electrical power was applied in six 45 second (s) pulses with 30 s delays between each pulse. The thrust profiles showed repeatable thrust levels at constant power with distinct transients between firing and standby. The propellant pressure varied between 56 kilopascals (kPa) and 82 kPa during testing and no leaks through the nozzles were observed. No unexpected impulses were observed when the tested embodiments of microthruster 100 were not firing, which was a significant improvement over earlier microthruster designs.

In another test of embodiments of microthruster 100, thrust measurements were taken at varying power levels from 50 mW to 400 mW in 25 mW increments. At 50 mW, the thrust was 18.0 μN, which corresponds to a thrust-to-power ratio of 359.6 micronewtons per watt (μN/W). As electrical power to the heating element 140 was increased, thrust increased fairly linearly while thrust-to-power decreased. The decrease in the thrust-to-power ratio was initially sharp, then tapered significantly at power levels above 75 mW. A peak thrust value of 81.3 μN was achieved at 400 mW for a thrust-to-power ratio of 203.4 μN/W.

Observations of ice generation were also made on various embodiments of microthruster 100. The smallest nozzle throat that produced ice had a nozzle throat 122 outlet area of 64.9 square micrometers (μm$^2$). As such, nozzle throats 122 with cross sectional areas of approximately 6 μm$^2$ were significantly smaller than the smallest observed nozzle throat cross section that resulted in ice production and are expected to be able to operate ice free throughout their lifespan.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments.

To clarify the use of and to hereby provide notice to the public, the phrases "at least one of <A>, <B>, . . . and . . . <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment.

Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

Element Numbering

Table 1 includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

TABLE 1

| | |
|---|---|
| 100 | microthruster |
| 110 | nozzle |
| 112 | exhaust cavity |
| 120 | nozzle array |
| 122 | nozzle throat |
| 123 | nozzle throat width |
| 124 | nozzle throat height |
| 125 | nozzle throat length |
| 127 | nozzle bottom wall |
| 128 | nozzle side wall |
| 130 | first layer (e.g., "bottom" layer) |
| 131 | propellant reservoir bottom wall |
| 132 | propellant reservoir |
| 133 | propellant reservoir side wall |
| 134 | access port |
| 135 | propellant supply port |
| 136 | propellant supply port |
| 137 | channel |
| 138 | propellant jet |
| 140 | heating element |
| 142 | channel |
| 144 | electrical contact pads |
| 150 | second layer (e.g., "top" layer) |
| 200 | microthruster |
| 212 | nozzle exhaust cavity |
| 220 | nozzle array |
| 230 | first layer |
| 234 | access port |
| 235 | propellant supply port |
| 240 | heating element |
| 242 | heating element channel |
| 244 | electrical contact pad |
| 250 | second layer |
| 320 | nozzle array |
| 312 | nozzle exhaust cavity |
| 322 | nozzle throat |
| 330 | first layer |
| 332 | propellant reservoir |
| 340 | heating element |

What is claimed is:

1. A method of manufacturing a microthruster for a spacecraft, comprising:
    forming a nozzle throat channel for a micronozzle in a first layer or a second layer;
    forming a water reservoir channel in the first layer or the second layer, the water reservoir channel defined by a reservoir lower wall and a side surface;
    forming a water supply port, the water supply port having a central axis;
    forming a heating element, wherein the heating element is spaced at least 1 μm from the nozzle throat;
    bonding the first layer and the second layer to one another, said bonding forming a nozzle throat between the first layer and the second layer for ejecting water from the microthruster, and said bonding forming a water reservoir between the first layer and the second layer, wherein the water reservoir is bounded by a reservoir upper wall and the reservoir lower wall, the water reservoir being in fluidic communication with the nozzle throat,
    wherein the heating element partially covers the reservoir upper wall or the reservoir lower wall, the heating element is configured to contact water within the water reservoir, the heating element is positioned along the reservoir upper wall or the reservoir lower wall, and the central axis of the water supply port intersects the heating element.

2. The method of claim 1, wherein:
    the heating element covers less than the whole of a surface of the reservoir upper wall or the reservoir lower wall.

3. The method of claim 2, wherein forming the heating element comprises:
    depositing titanium on the reservoir upper wall or the reservoir lower wall;
    depositing platinum on the titanium, and
    wherein the first or second layer on which the titanium is deposited comprises borosilicate.

4. The method of claim 1, wherein the nozzle throat defines a cross sectional area equal to at most 20 square micrometers ($\mu m^2$).

5. The method of claim 4, wherein the nozzle throat defines a cross sectional area equal to 6 $\mu m^2$.

6. The method of claim 1, wherein forming the nozzle throat channel comprises Deep Reactive Ion Etching (DRIE).

7. The method of claim 1, wherein forming the nozzle throat channel includes forming the nozzle throat channel in the first layer and wherein forming the propellant reservoir channel includes forming the propellant reservoir channel in the first layer, and wherein the first layer is a silicon wafer.

8. The method of claim 1, wherein
    forming the nozzle throat channel includes forming a plurality of nozzle throat channels in the first layer or the second layer;
    forming the propellant reservoir channel includes forming a plurality of angled side surfaces of the propellant reservoir, each angled side surface being adjacent to one of the plurality of nozzle throat channels; and
    forming the heating element includes forming the heating element with an edge of the heating element adjacent to the plurality of angled side surfaces to thereby form a saw tooth pattern.

9. A microthruster for a spacecraft, comprising:
    a water supply port having a central axis;
    a water reservoir bounded by a reservoir upper wall and a reservoir lower wall; and
    a nozzle throat in fluid communication with the water reservoir, the nozzle throat defining a cross sectional area equal to or less than 20 square micrometers (20 $\mu m^2$); and
    a heating element in thermal communication with the water reservoir, wherein the reservoir upper wall or the reservoir lower wall is partially covered by the heating element, the heating element is configured to contact water within the water reservoir, the heating element is positioned along the reservoir upper wall or the reservoir lower wall, the central axis of the water supply port intersects the heating element, the heating element is spaced at least 1 μm from the nozzle throat, and the heating element is configured and adapted to heat water in the water reservoir, increase the pressure within the water reservoir, and cause the water to be expelled from the nozzle throat.

10. The microthruster of claim 9,
wherein the heating element is spaced between 1 μm and 10 μm from the nozzle throat.

11. The microthruster of claim 10,
wherein a first portion of the water reservoir is defined by silicon and a second portion of the water reservoir is defined by platinum, and
wherein a first portion of the nozzle throat is defined by silicon and a second portion of the nozzle throat is defined by borosilicate glass.

12. A microthruster, comprising:
a first layer; and
a second layer bonded to the first layer;
a propellant reservoir positioned between the first layer and the second layer, one of the first layer and the second layer defining an upper wall of the propellant reservoir and the other of the first layer and the second layer defining a lower wall of the propellant reservoir;
a propellant supply port having a central axis,
a nozzle throat positioned between the first layer and the second layer, the nozzle throat being in fluid communication with the propellant reservoir, and one of the first layer and the second layer defining a first wall of the nozzle throat, wherein the first wall of the nozzle throat is one of an upper wall and a lower wall of the nozzle throat; and
a heater in thermal communication with the propellant reservoir, the heater partially covering the upper wall or the lower wall of the propellant reservoir wherein the heater is configured to contact water within the propellant reservoir, the heater is positioned along the upper wall or the lower wall, the central axis of the propellant supply port intersects the heater, the heater is spaced at least 1 μm from the nozzle throat, and the heater is configured and adapted to heat the water within the propellant reservoir resulting in water moving into the nozzle throat and being expelled from the nozzle throat.

13. The microthruster of claim 12, wherein
the distance between the upper wall of the propellant reservoir and the lower wall of the propellant reservoir defines a propellant reservoir height;
the nozzle throat is bounded by a second wall of the nozzle throat different from the first wall of the nozzle throat, the second wall of the nozzle throat being one of the upper wall and the lower wall of the nozzle throat, and the distance between the upper wall of the nozzle throat and the lower wall of the nozzle throat defines a nozzle throat height; and
the nozzle throat height is less than the propellant reservoir height.

14. The microthruster of claim 12, wherein:
the microthruster is a planar microthruster defining a width and a length,
the bonded first and second layers form the planar microthruster,
the planar microthruster further defines one or more thin side surfaces,
each of the one or more thin side surfaces defines a height,
each of the heights of the one or more thin side surfaces is less than or equal to one-fifth of one of the width or the length, and
the nozzle throat is defined in one of the one or more thin side surfaces.

15. The microthruster of claim 12, wherein the nozzle throat defines a cross sectional area equal to at most 20 square micrometers ($\mu m^2$).

16. The microthruster of claim 12, wherein the nozzle throat defines a cross sectional area equal to 6 $\mu m^2$.

17. The microthruster of claim 12,
wherein the heater is spaced between 1 μm and 10 μm from the nozzle throat.

18. The microthruster of claim 12, wherein
the first layer and the second layer define an array of nozzle throats positioned between the first layer and the second layer, the array of nozzle throats being bounded on one side by the first layer or the second layer,
each of the nozzle throats of the array of nozzle throats defining an ejection direction along which propellant is expelled,
each of the nozzle throats of the array of nozzle throats being in fluid communication with the propellant reservoir,
the propellant reservoir being further defined by pairs of side walls, each pair of side walls being adjacent to a nozzle throat of the array of nozzle throats, and
the pairs of side walls form a saw tooth pattern, wherein each side wall of each pair of side walls is angled with respect to the nozzle throat to which each side wall is adjacent by at least 120 degrees and at most 165 degrees.

19. The microthruster of claim 12, wherein the first layer comprises a hydrophobic material, and the second layer comprises a thermally insulating and electrically insulating material.

20. The microthruster of claim 19, wherein the first layer comprises silicon and the second layer comprises borosilicate glass.

21. The microthruster of claim 12, wherein the ratio of the nozzle throat height to the nozzle throat width is from 6 to 6.3.

* * * * *